United States Patent [19]
Barak

[11] Patent Number: 5,861,959
[45] Date of Patent: Jan. 19, 1999

[54] FACSIMILE LONG TERM STORAGE AND RETRIEVAL SYSTEM

[75] Inventor: Haim Barak, Kfar Saba, Israel

[73] Assignee: Nice Systems, Ltd., Tel Aviv, Israel

[21] Appl. No.: 797,484

[22] Filed: Feb. 6, 1997

[30] Foreign Application Priority Data

Feb. 7, 1996 [IL] Israel ........................................ 117071

[51] Int. Cl.$^6$ .................................................. H04N 1/00
[52] U.S. Cl. ........................................ 358/403; 358/400
[58] Field of Search ..................... 358/400, 402, 358/403, 407, 434, 435, 436, 440, 468, 404; 370/351, 354, 360, 362, 382–386; 379/100.04, 100.06, 100.12, 100.13, 102.02, 67

[56] References Cited

U.S. PATENT DOCUMENTS

| | | | |
|---|---|---|---|
| 4,935,955 | 6/1990 | Neudorfer | 379/100 |
| 4,994,926 | 2/1991 | Gordon et al. | 358/400 |
| 5,014,300 | 5/1991 | Harvath et al. | 379/100 |
| 5,237,430 | 8/1993 | Sakurai | 358/444 |
| 5,357,562 | 10/1994 | Metser et al. | 379/67 |

FOREIGN PATENT DOCUMENTS

2282725  4/1995  United Kingdom ............. H04N 1/21

Primary Examiner—David K. Moore
Assistant Examiner—Jerome Grant, II
Attorney, Agent, or Firm—Needle & Rosenberg, P.C.

[57] ABSTRACT

A passive long term facsimile transmission storage and retrieval system, which includes a facsimile logger passively coupled to at least one telephone line connected to a facsimile machine is provided. The facsimile logger acquires and stores the facsimile transmissions that occur on the telephone line, on long term archive media. The system also includes a database coupled to the facsimile logger and at least one workstation coupled to the facsimile logger. The database holds relevant data associated with the stored facsimile transmission. The workstation is able to search for and retrieve the facsimile transmissions previously stored by the facsimile logger on the long term archive media.

6 Claims, 12 Drawing Sheets

FACSIMILE LONG TERM STORAGE AND RETRIEVAL SYSTEM

FIELD OF THE INVENTION

The present invention relates to facsimile logging devices and in particular to an active and passive facsimile storage and retrieval system.

BACKGROUND OF THE INVENTION

The use of facsimile transmission equipment has been steadily increasing over recent years. Facsimile transmission is a very convenient mechanism of transmitting documents and images from one location to another in near real time. The almost instantaneous transmission speed of facsimile transmission equipment is a huge advantage over regular conventional mail delivery and accounts for the immense popularity of facsimile as the transmission mechanism of choice in many business.

With the exploding use of facsimile equipment today, there are many businesses that conduct a substantial amount of their business through facsimile transmissions. In addition, many businesses and government agencies use facsimile equipment to send and receive data on a daily basis. These same companies typically also employ sophisticated telephone systems for handling their high volume of inbound and outbound telephone calls. Many businesses such as banking institutions, insurance companies and government entities have an additional requirement of recording and archiving telephone conversations occurring on company telephones. The necessity of recording telephone calls might be required for any number of reasons such as security, liability, eavesdropping, etc. Telephone archiving systems exist today and are employed by many businesses to record, on a long term basis, all internal and external telephone calls.

As with voice telephone call long term storage and retrieval, there is a long felt need by many businesses to be able to store on a long term basis, both inbound and outbound facsimile transmissions. Facsimile storage systems exist in the prior art however none disclose the long term storage, archival and retrieval of facsimile transmissions.

U.S. Pat. No. 4,935,955, issued to Neudorfer, discloses a system for interfacing central office telephone lines with internal facsimile machines. Incoming facsimile transmission data is placed in a memory temporary storage area after being received and before being transmitted. Facsimile transmissions are deleted from the storage after they are transmitted.

U.S. Pat. No. 5,235,433, issued to Clarkson et al., discloses a system and method for automatically indexing facsimile transmissions into an image management system by applying telephony data accompanying the facsimile transmission to index the transmission by use of a substitution table.

U.S. Pat. No. 5,357,562, issued to Metser et al., discloses an automated facsimile/voice memory managing system which includes a facsimile board, a voice response board, a storage device and central processing unit (CPU). The storage means disclosed, however, is used to store facsimile transmission on a temporary basis.

U.S. Pat. No. 5,014,300, issued to Harvath et al., discloses a facsimile store and forward network that includes a network access device and an address processing unit that cooperates to interface an originating facsimile machine with a store and forward inbound node. Facsimile transmission, however, are stored on a temporary basis only.

Another potential problem that exists in present facsimile transmission storage devices is that if the facsimile transmission equipment is using a proprietary non-standard facsimile protocol, it becomes impossible to receive and store it without knowledge of the protocol. One solution to this problem is to have the facsimile transmission recording equipment determine the facsimile protocol to use and subsequently instruct the two facsimile machines accordingly.

SUMMARY OF THE INVENTION

Accordingly, it is an object of the present invention to provide a long term facsimile transmission storage system whereby facsimile transmissions are archived on suitable archive media and are able to be stored for relatively long periods of time.

It is another object of the present invention to provide a facsimile search and retrieval system able to search for, locate and retrieve any facsimile transmission previously archived.

Yet another object of the present invention is to provide a long term storage and retrieval system that utilizes industry standard archive devices and media.

Another object of the present invention is to provide a long term facsimile storage and retrieval system that is able to record facsimile transmissions in a passive manner without interfering with the transmissions.

It is another object of the present invention to provide a long term facsimile storage and retrieval system that can be configured to actively store and forward facsimile transmissions and to also select the facsimile transmission protocol used by the facsimile transmission equipment on both sides of the transmission.

There is thus provided in accordance with a preferred embodiment of the present invention, a passive long term facsimile transmission storage and retrieval system which includes a facsimile logger passively coupled to at least one telephone line connected to a facsimile machine, the facsimile logger acquiring and storing facsimile transmissions that occur on the at least one telephone line, the facsimile logger storing the facsimile transmissions on long term archive media, a database coupled to the facsimile logger, the database for holding relevant data associated with the stored facsimile transmission, and at least one workstation coupled to the facsimile logger, the at least one workstation able to search and retrieve the facsimile transmissions previously stored by the facsimile logger on the long term archive media.

There is also provided in accordance with a preferred embodiment of the present invention an active long term facsimile transmission storage and retrieval system which includes a facsimile logger coupled between at least one telephone line and at least one facsimile machine, the facsimile logger storing and forwarding facsimile transmissions that either arrive on the at least one telephone line or that are originated by the at least one facsimile machine, the facsimile logger storing the facsimile transmissions on long term archive media, a database coupled to the facsimile logger, the database for holding relevant data associated with the stored facsimile transmission, and at least one workstation coupled to the facsimile logger, the at least one workstation able to search and retrieve the facsimile transmissions previously stored by the facsimile logger on the long term archive media.

In addition, there is also provided in accordance with a preferred embodiment of the present invention a passive facsimile logger coupled passively to a telephone line connected to a facsimile machine which includes a passive telephone line interface coupled to the telephone line, the passive telephone line interface interfacing the telephone line to a fax/modem without interfering with facsimile transmissions occurring on the telephone line, the fax/modem coupled to the passive telephone line interface, the fax/modem for translating the facsimile transmissions from a telephone line facsimile signal format into digital facsimile data, a processor coupled to the fax/modem for receiving and processing the digital facsimile data, the processor controlling the operation of the passive facsimile logger, a database coupled to the processor, the database holding relevant data associated with the facsimile transmissions, a storage coupled to the processor, the storage providing a temporary memory storage area for the facsimile transmissions as they are received from the telephone line, an archive subsystem coupled to the processor, the archive subsystem recording the facsimile transmissions on long term archive media, the archive subsystem retrieving the facsimile transmissions, previously archived, upon command from the processor, and an archive queue coupled to the processor, the archive queue holding the facsimile transmissions that have been received and are awaiting to be archived.

BRIEF DESCRIPTION OF THE DRAWINGS

The invention is herein described, by way of example only, with reference to the accompanying drawings, wherein.

DETAILED DESCRIPTION OF THE INVENTION

Figure 1:
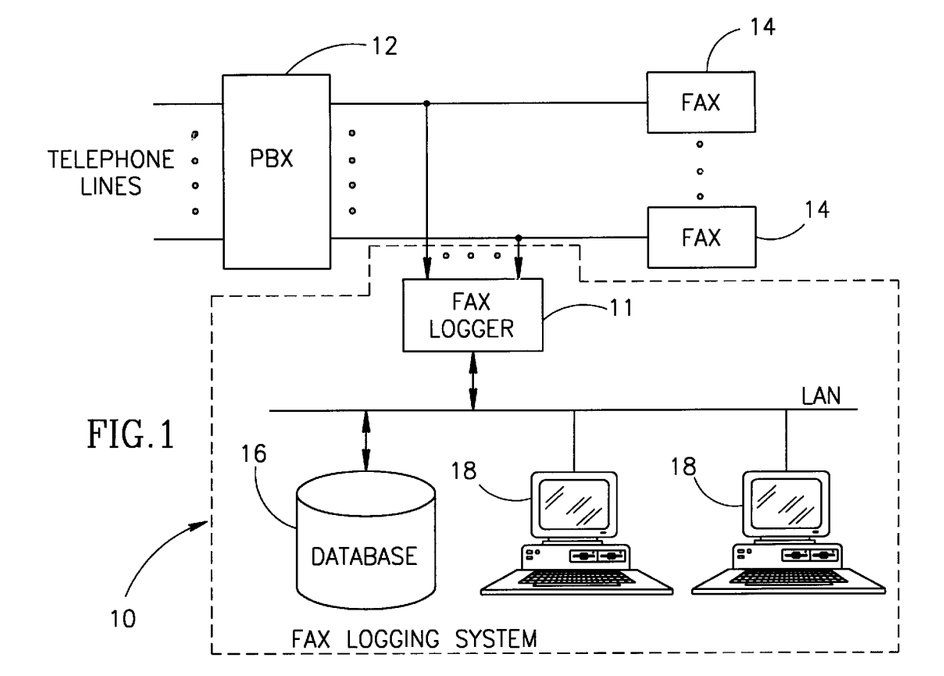
FIG. 1 is a high level block diagram illustrating a preferred embodiment of the passive facsimile logging system of the present invention applied to a sample telephone system having multiple attached facsimile devices.

A high level block diagram illustrating a preferred embodiment of a passive facsimile (fax) logging system 10 of the present invention applied to a sample telephone system having multiple attached facsimile devices is shown in FIG. 1. One or more telephone or trunk lines from a central office (CO) are coupled to a private branch exchange (PBX) 12. One or more extensions couple PBX 12 to one or more facsimile machines 14. Fax logger 11 is coupled in a passive manner to each PBX extension connected to a facsimile machine. The passive connection does not interfere in the sending and receiving of facsimiles from and to the facsimile machines 14. Fax logger 11 listens to the each extension it is coupled to and when it senses a facsimile transmission present on the line, it records related data in a database 16 and archives the transmission on suitable archive media such as magnetic tape, optical disk (i.e. write once read many (WORM), magneto-optical, etc.) or high capacity conventional hard disk drives. Database 16 can be either external to fax logger 11 or integrated internally within fax logger 11. In the example illustrated in FIG. 1, database 16 is shown coupled to fax logger 11 through a local area network (LAN).

Fax logging system 10 also includes retrieval capabilities whereby any facsimile previously stored and archived by the fax logging system can be searched for and retrieved. One or more workstations 18 are coupled to fax logger 11 through the LAN. Workstations 18 provide the software front end user interface to allow a user to construct search queries and browse through retrieved facsimile records. Included are other various software tools used in connection with searching and viewing previously archived facsimile records. In an alternative embodiment, the user interface employed in workstations 18 can be integrated within fax logger 11 itself.

Illustrated in FIG. 1 is an example of a preferred passive fax logging system. A passive fax logging system is preferred because it is desirable to not interfere at all in the process of sending and receiving facsimiles. No interference is possible if standard facsimile protocols are used in the transmission (i.e. International Telegraphic Union (ITU) facsimile protocols). However, preventing interference with facsimile transmissions is not always feasible because it is possible that two facsimile machines do not use a standard protocol but rather use a company proprietary or otherwise non-standard facsimile protocol. A solution to this problem is to become active in the facsimile acquisition process rather than remain passive. In the alternative active embodiment, the fax logging system determines what facsimile transmission protocols both sides will use. The fax logging system chooses a standard protocol for both sides of the transmission.

Figure 2:
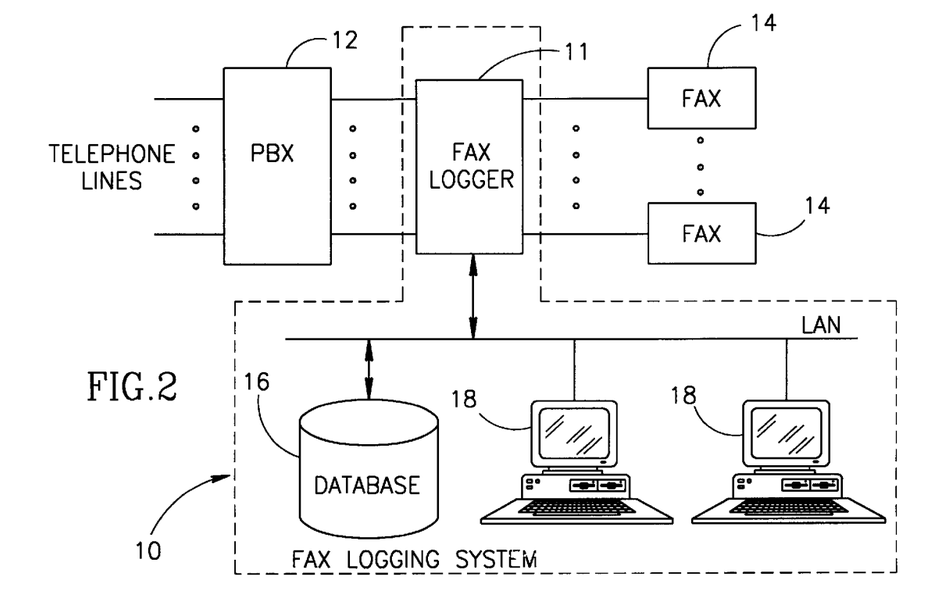
FIG. 2 is a high level block diagram illustrating an alternative embodiment of the active facsimile logging system of the present invention applied to a sample telephone system having multiple attached facsimile devices.

A high level block diagram illustrating an alternative embodiment of the active facsimile logging system of the present invention applied to a sample telephone system having multiple attached facsimile devices is shown in FIG. 2. In this active embodiment, fax logging system comprises fax logger 11 coupled between PBX 12 and facsimile machines 14, database 16 coupled to a LAN and one or more workstations 18. As in FIG. 1, one or more telephone or trunk lines from the CO are coupled to PBX 12. One or more PBX extensions are coupled to fax logger 11. Fax logger 11, in turn, is coupled to one or more facsimile machines 14. All facsimile transmissions must pass through fax logger 11. Using this scheme, fax logger 11 can determine the transmission protocol to use for both sides of the transmission.

As in the passive embodiment discussed above, database 16 is illustrated external to fax logger 11 but can also be integrated internally with fax logger 11. Similarly, workstations 18 provide the software tools comprising the user interface for retrieving and browsing or viewing previously archived facsimiles and can be located external to fax logger 11 or integrated internally with it.

Figure 3:
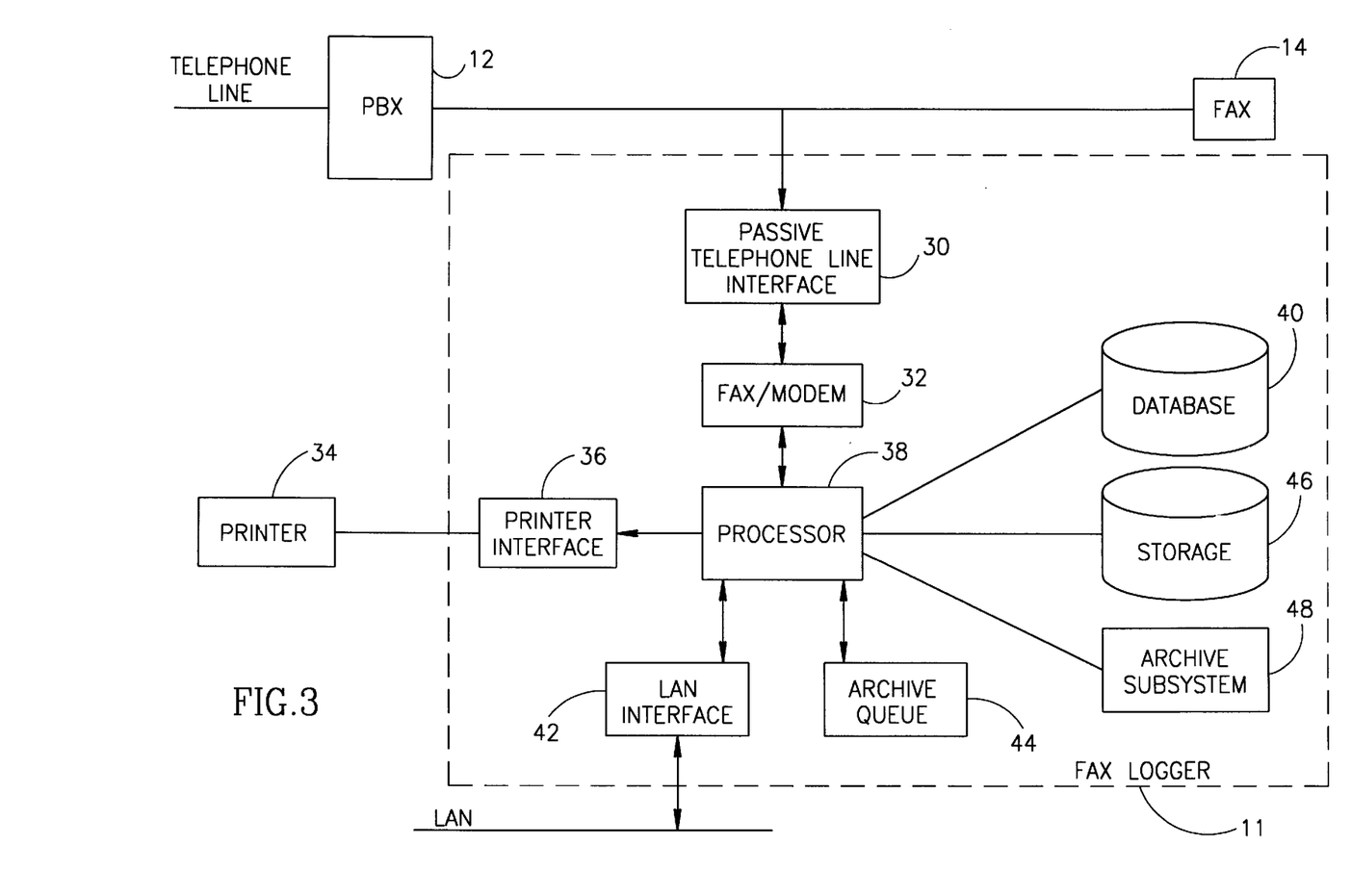
FIG. 3 is a detailed block diagram illustrating a single channel passive facsimile logging system applied to a sample telephone system.

With reference to FIG. 3, fax logger 11 will now be described in more detail. Illustrated in FIG. 3 is an embodiment of a single channel passive fax logger 11. A telephone line or trunk from the CO is coupled to PBX 12. An extension connects PBX 12 to facsimile machine 14. Fax logger 11 comprises a passive line interface 30, fax/modem 32, processor 38, database 40, storage 46, archive subsystem 48, archive queue 44, LAN interface 42 and printer interface 36. Passive fax logger 11 constantly listens to the extension line and waits for a facsimile transmission. Once a facsimile transmission is detected, fax logger 11 stores it, records pertinent related data in a database and records the facsimile transmission on archive media.

Fax logger 11 listens to the PBX extension line through passive line interface 30. Circuitry in passive line interface 30 functions to unobtrusively allow the fax logger to hear everything that occurs on the line but does not interfere in the sending or retrieving of facsimiles. Devices that perform this listening function are well known in the art, being used extensively in voice recording systems, thus they will not be described in further detail. The signal received by passive line interface 30 is output to fax/modem 32. Fax/modem 32 functions to receive the tapped signal and, using the appropriate facsimile transmission protocol, convert the facsimile transmission into a more practical and usable digital format. As with passive line interface 30, fax/modem devices are also well known in the art and thus need not be described further. Standard fax/modems used today in many personal computer applications will work in the present invention with minor modification. Conventional fax/modems are designed to connect to a telephone line, typically through an RJ-11 connector. The signals present on a telephone line are similar but not identical to the signals output by passive line interface 30. The modifications needed to be made pertain to the matching the electrical interface to the passive telephone line interface and would be apparent to one skilled in the art.

The digital data output from fax/modem 32 is input to processor 38. Processor 38 can be a microprocessor, personal computer, or any other suitably programmed computing device. Processor 38 controls the internal operations of fax logger 11 and overseas the facsimile acquisition, archiving and retrieval processes. As facsimiles are being acquired, they are stored temporarily in storage 46. Storage 46 is any suitable storage device such as a hard disk drive. It is important that storage device 46 be suitably large and fast enough to store incoming acquired facsimile transmissions. Facsimiles remain on storage device 46 until they can be archived at which time they are removed from storage 46. As will be described in more detail below, after facsimiles are acquired, related facsimile data about the transmission is stored in database 40. In FIG. 3, database 40 is illustrated as being internal and integral with fax logger 11. An externally located database would also work as well. Once the relevant data has been stored in database 40, the facsimile is placed onto archive queue 44 where it awaits archiving. Eventually, the facsimile transmissions are taken from archive queue 44 and sent to archive subsystem 48 for permanent recording onto suitable archive media. It is a high priority to record the incoming facsimile transmission in storage as quickly as possible, in order to avoid potential problems caused by, for example, a power failure, etc. Thus a large and fast hard disk drive should be used for the storage (e.g., fast and wide SCSI-2 hard disk drives).

Processor 38 is coupled to a LAN interface 42 which provides an interface to the LAN. In addition, printer interface 36 couples processor 38 to a printer 34. Printer 43 functions to generate labels for the archive media to facilitate the handling of the actual disks, tape cassettes, etc.

Figure 4:
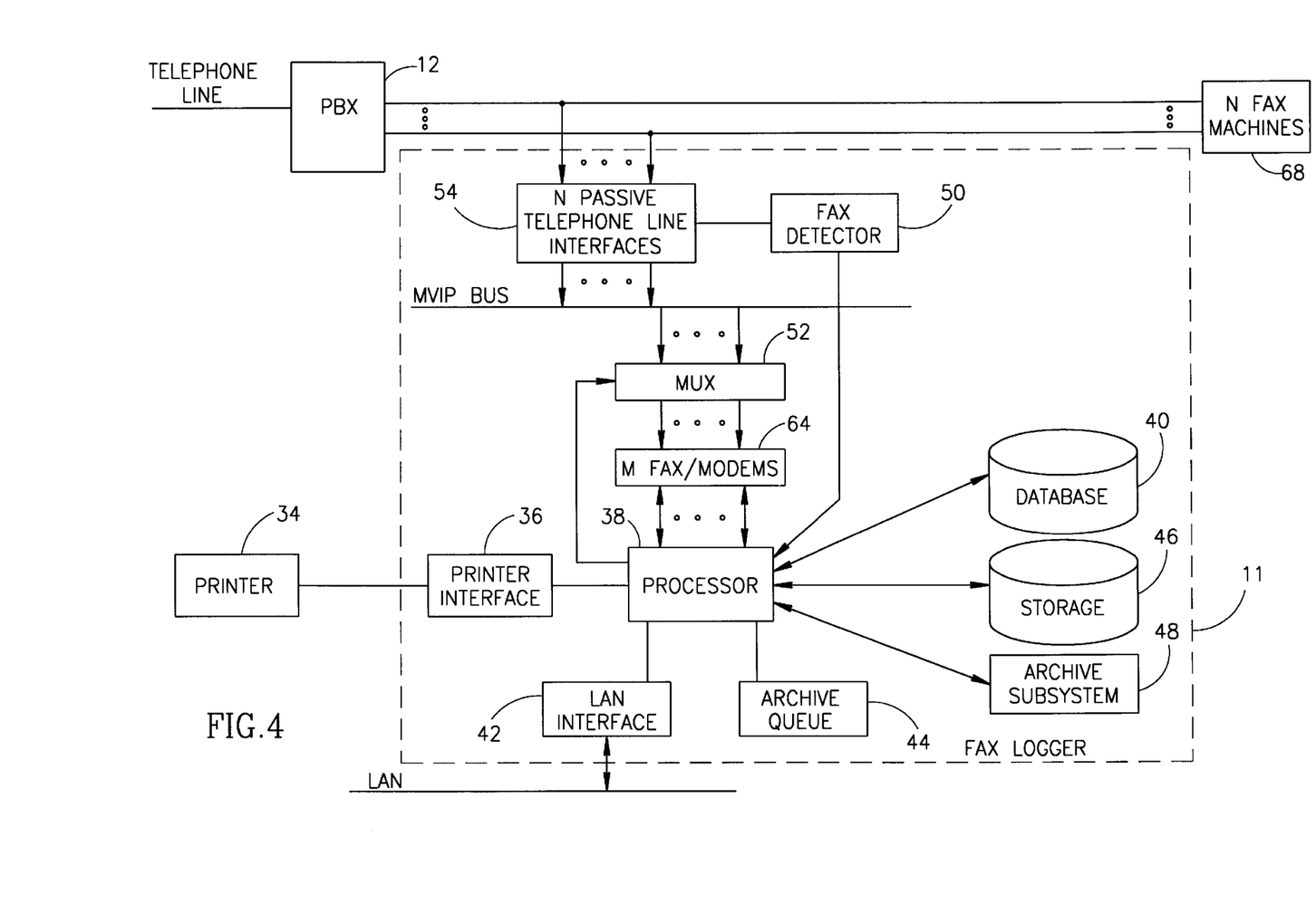
FIG. 4 is a detailed block diagram illustrating a multi-channel passive facsimile logging system applied to a sample telephone system.

A detailed block diagram illustrating a multiple channel fax logger applied in a passive configuration to a sample telephone system is shown in FIG. 4. In this preferred embodiment, PBX 12 is coupled to N facsimile machines. Fax logger 11 is coupled to each of these N PBX extension lines through N passive telephone line interfaces 54. The function of N passive telephone line interfaces 54 are similar to those described in connection with the single channel fax logger illustrated in FIG. 3. Each individual interface listens for facsimile transmission on its extension. In this embodiment, however, each telephone interface is coupled to a multi-vendor interface protocol (MVIP) bus, commonly used to allow different telco equipment from different vendors to communicate which each other. Also coupled to the MVIP bus is an N input/M output multiplexer (mux) 52. Mux 52 can be any device that can switch any of N inputs to any of M outputs, such as a multiple input and output switch, etc. Coupled to mux 52 are M fax/modems 64. Fax/modems 64 are identical to those described in connection with FIG. 3. Fax detection circuitry 50 is coupled to each of N individual passive telephone line interfaces 54 and to processor 38. Fax detector functions to listen to each of N PBX extension lines and informs processor 38 when a facsimile transmission is occurring on a line.

Processor 38, database 40, storage 46, archive subsystem 48, archive queue 44, LAN interface 42 and printer interface 36 function similarly to the corresponding components described in connection with FIG. 3. The switching or selection control of mux 52 is performed by processor 38 through a control signal line coupled from processor 38 to mux 52. At any one time M fax/modems 64 are coupled to N telephone extension lines through the MVIP bus and the passive telephone line interfaces. Both N and M can be any positive integer. The system may have more telephone lines than fax/modems, an equal number of telephone lines and fax/modems or less telephone lines than fax/modems. Typically there will be more telephone lines than fax/modems, in which case it is possible that some facsimile transmissions will be archived. Fax detector 50 listens to all N telephone extensions. When a facsimile transmission is detected, a signal is transmitted to processor 38, which, in turn, couples a fax/modem to the appropriate extension. The MVIP bus allows each passive telephone line interface to be connected to one of the inputs of mux 52.

Figure 5:
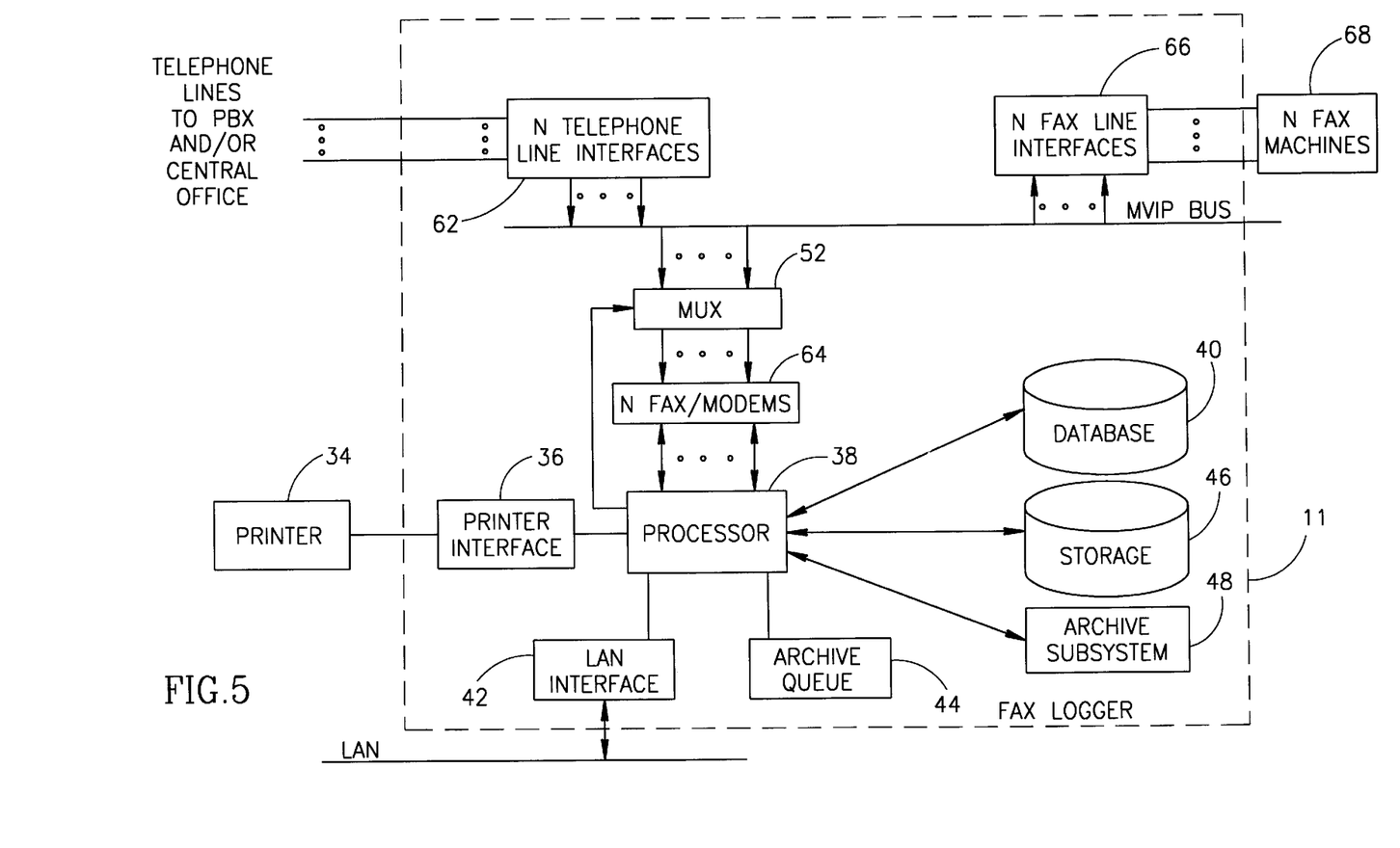
FIG. 5 is a detailed block diagram illustrating a multi-channel active facsimile logging system applied to a sample telephone system.

A detailed block diagram illustrating a multichannel active facsimile logging system applied to a sample telephone system is shown in FIG. 5. In this embodiment, the PBX extensions or telephone lines are not connected directly to the fax machines. The connection between telephone lines and fax machines is broken and the fax logger is inserted between them. All facsimile transmissions sent from and to the local fax machine are intercepted by the fax logger. In this manner, the fax logger controls the protocols used in the transmissions.

The N PBX extensions or telephone lines are input to N telephone line interfaces 62. The output of N telephone line interfaces 62 is coupled to an MVIP bus. Line interfaces 62 convert the signals present on the telephone line or PBX extension into signals suitable for placement onto the MVIP bus. N fax machines are coupled to N fax line interfaces 66. The fax line interfaces provide an interface between the MVIP bus and the conventional facsimile signals used on regular telephone lines or extensions. Also coupled to the MVIP bus is an N input/M output multiplexer or switch 52. Mux 52 is able to switch any of N inputs onto any of M outputs. The M output signals from mux 52 are fed to M fax/modems 64. Each fax/modem handles the signal from a different output from mux 52. The fax/modems convert the telephone line signals into a format processor 38 can understand. The processor 38 receives the output of each fax/modem and provides a control signal to mux 52 to select which inputs are to be switched to which outputs. Database 40, storage 46, archive subsystem 48, archive queue 44, LAN interface 42 and printer interface 36 function similarly to the corresponding components discussed in connection with FIG. 3.

In operation, processor 38 listens for facsimile transmissions on M telephone lines or PBX extensions. When a facsimile transmission is detected, it is stored on storage device 46 and forwarded to one of N fax machines at a later time. In addition, facsimile transmissions originating from N fax machines 68 are also detected. The store and forward mechanism assures that the a standard facsimile transmission protocol will be used for both sending and receiving facsimiles. Once the facsimile is stored and placed onto the archive queue, as in the embodiments discussed previously, it is translated into a standard facsimile transmission protocol, regardless of the original transmission protocol used (i.e. PCS, TIFF, or any other compressed format). If the transmission originated on a telephone line or PBX extension it is sent out through the particular fax/modem 64 and mux 52, onto the MVIP bus, to one of N fax line interfaces and finally to one of N fax machines. If it originated from one of N fax machines 68, it is sent out through the particular fax/modem 64 and mux 52, onto the MVIP bus, to one of N telephone line interfaces 62 and out to the telephone line or PBX extension. This process will be described in more detail below.

Figure 6:
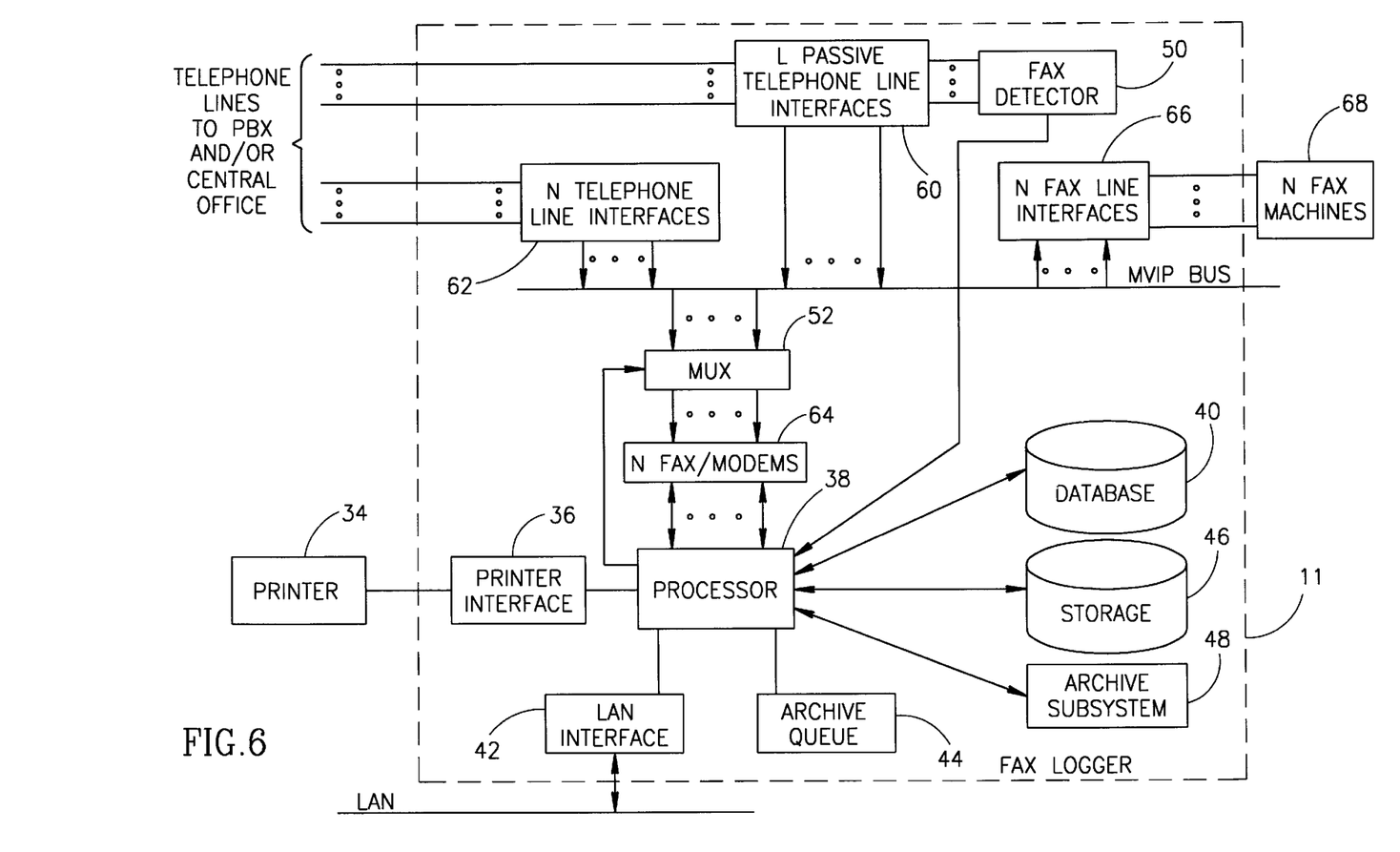
FIG. 6 is a detailed block diagram illustrating a multi-channel active and passive facsimile logging system applied to a sample telephone system.

A high level block diagram of an embodiment of the fax logger combining both the passive and active embodiments is illustrated in FIG. 6. In this embodiment, L telephone lines or PBX extensions are coupled to L passive telephone line interfaces 60. The L passive telephone line interfaces are passively coupled to the lines that connect the telephone lines or PBX to fax equipment in such a way that the telephone line or PBX extension is not interfered with. L passive telephone line interfaces 60 are coupled to fax detector 50 which functions to detect the start of a facsimile transmission on any of its connected lines. The fax detector is coupled to processor 38 through a control signal line. The output of L passive telephone line interfaces 60 is coupled to the MVIP bus. Mux 52 functions to connect any of L outputs of L passive telephone interfaces 60 to any of M fax/modems 64. The numbers L, N and M are all positive integers.

In addition to the passive portion of the fax logger, the active portion of the fax logger comprises N telephone line interfaces 62 coupling N telephone lines or PBX extensions to the MVIP bus and N fax line interfaces 66 coupling N fax machines to the MVIP bus. Mux 52 functions to couple any of N telephone line interfaces 62 or N fax line interfaces 66 to any of M fax/modems 64. The remaining portion of the fax logger operates similarly, for both passive and active portions, as previously described in connection with FIGS. 4 and 5, respectively.

Figure 7:
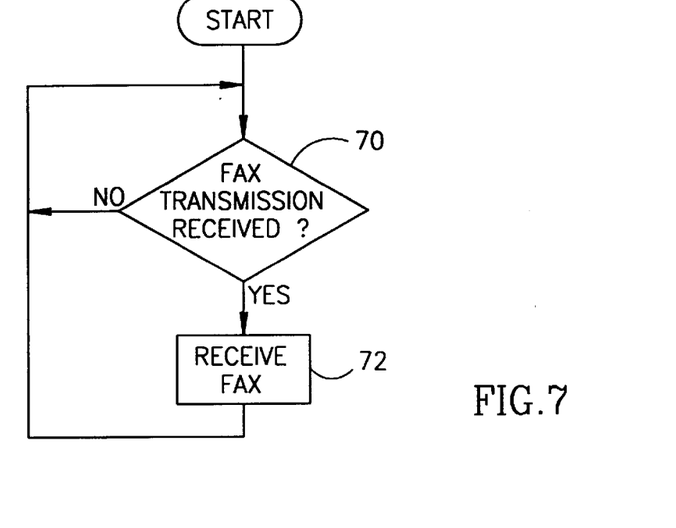
FIG. 7 a high level logic flow diagram illustrating the overall computer software process of the passive facsimile logging system.
Figure 8:
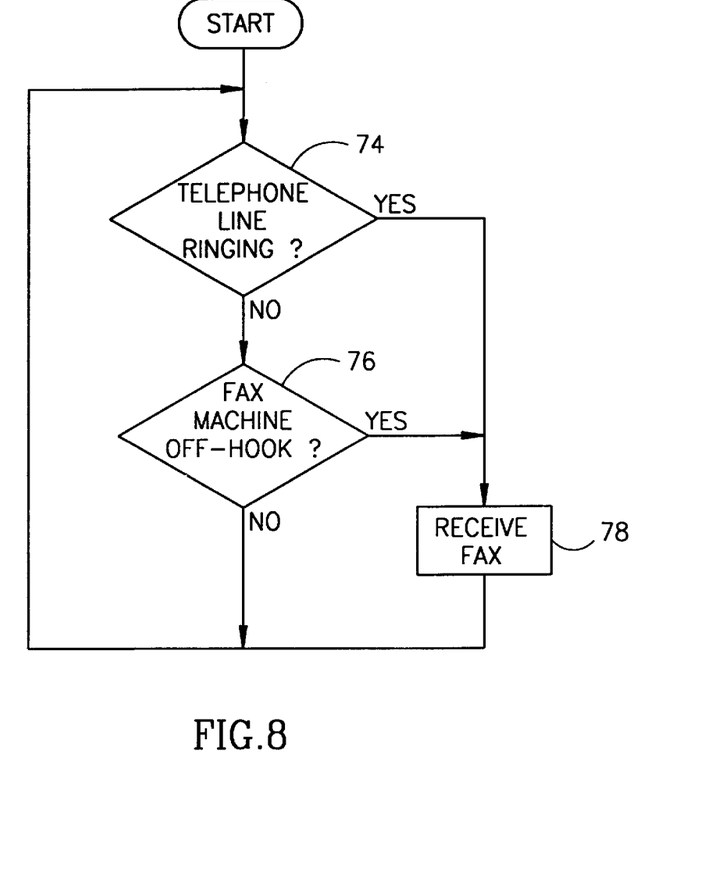
FIG. 8 is a high level logic flow diagram illustrating the overall computer software process of the active facsimile logging system.

A high level flow diagram of the software process used to control the passive fax logger is illustrated in FIG. 7. Generally, the fax logger waits and continually listens for the a facsimile transmission (step 70). Once detected, the facsimile transmission is received (step 72). A high level flow diagram of the software process used to control the active fax logger is illustrated in FIG. 8. Generally, the fax logger waits and listens for either the telephone line/PBX extension to ring (step 74) or for one of the fax machines to go off-hook (step 76). Once either of these events occur, the facsimile transmission is received (step 78).

Figure 9:
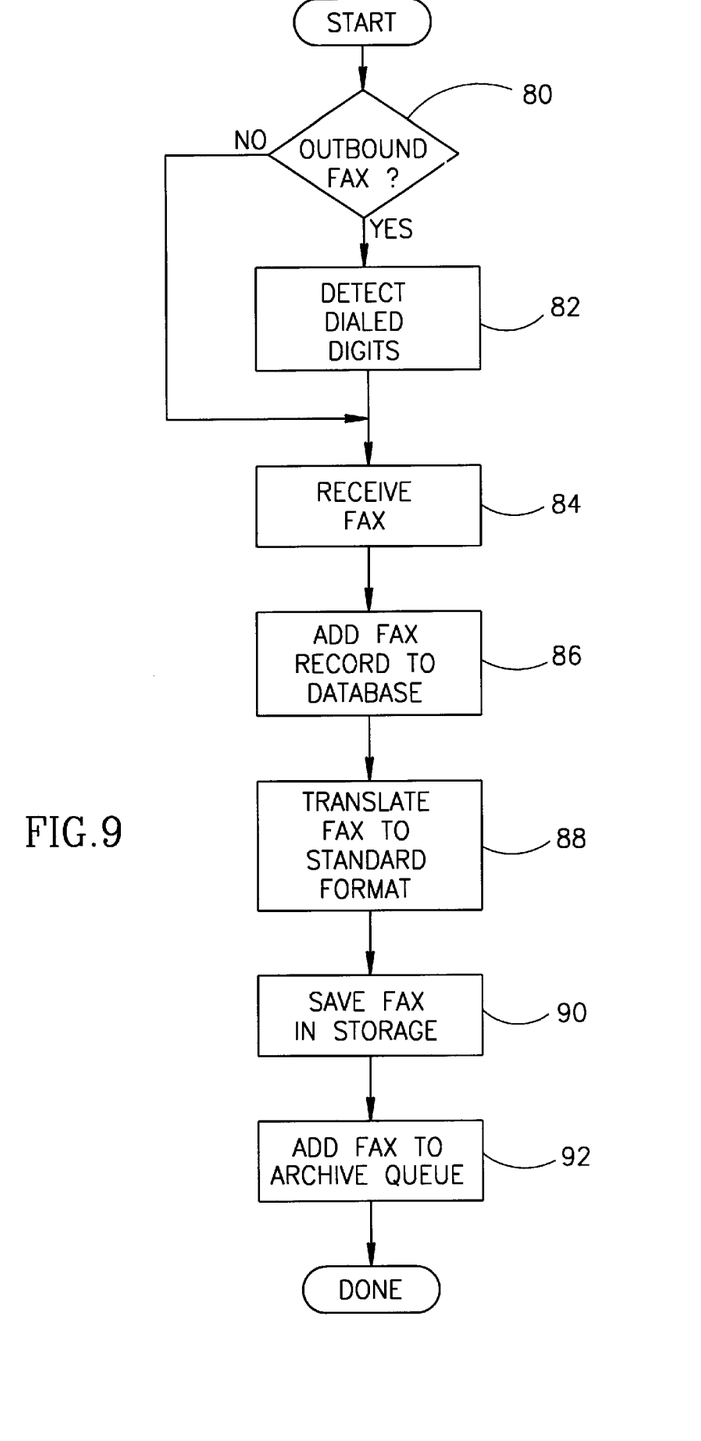
FIG. 9 is a high level logic flow diagram illustrating the receive facsimile process of the passive facsimile logging system.

The receipt of a facsimile transmission in the passive fax logger will now be described in more detail. A high level logic flow diagram illustrating the receive facsimile process of the passive facsimile logging system is shown in FIG. 9. First, it is determined whether the facsimile is outbound or inbound (step 80). It is outbound if one of fax machines went off-hook and dual tone multiple frequency (DTMF) tones are detected. It is inbound if ringing is detected on the line. If the facsimile is outbound than the digits are detected as they are dialed (step 82). For both outbound and inbound facsimiles, the transmission is then received (step 84). A database record is then created in database 40 (FIGS. 3 and 4) for holding data related to the facsimile transmission (step 86). The facsimile transmission is then translated into a standard format regardless of the original format used (step 88). Standard formats include formats such as PCX, TIFF, or any other standard bit mapped graphic format. The data is also typically compressed before being saved to storage. The facsimile is then stored in storage 46 (FIGS. 3 and 4) in the standard format (step 90). The facsimile is then added to archive queue 44 (FIGS. 3 and 4) which is a queue holding facsimiles waiting to be archived (step 92).

Figure 10:
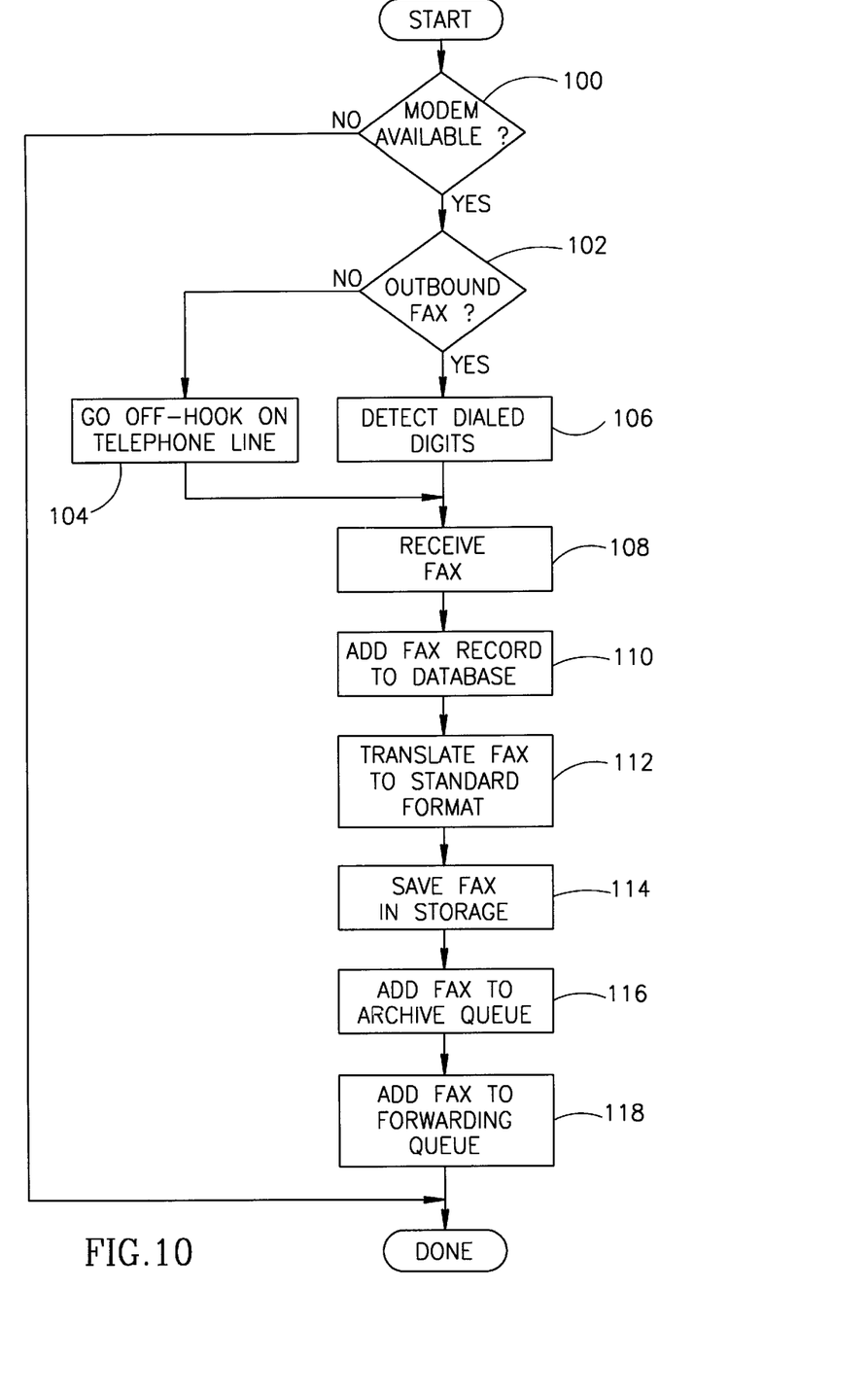
FIG. 10 is a high level logic flow diagram illustrating the receive facsimile process of the active facsimile logging system.

The receipt of a facsimile transmission in the active fax logger will now be described in more detail. A high level logic flow diagram illustrating the receive facsimile process of the active facsimile logging system is shown in FIG. 10. First, after the presence of a facsimile transmission is detected, it is determined whether a modem is available (step 100). If no modems are available, the facsimile cannot be archived and the process is exited. If a modem is available, it is determined whether the facsimile is outbound or inbound (step 102). If it is inbound, the particular telephone line interface 62 (FIGS. 5 and 6) is made to go off-hook (i.e. the call is answered) (step 104). If the facsimile is outbound, the off-hook condition and the dialed DTMF digits can be detected (step 106). For both inbound and outbound facsimiles, the transmission is then received (step 108). Similar to the passive receive facsimile process, a database record is then created in database 40 (FIGS. 5 and 6) for holding data related to the facsimile transmission (step 110). Regardless of the original facsimile transmission protocol, it is translated into a standard format (i.e. PCX, TIFF, or any other compressed format) (step 112). Standard formats include formats such as PCX, TIFF, or any other standard bit mapped graphic format. The data is also typically compressed before being saved to storage. The facsimile is then stored in storage 46 (FIGS. 5 and 6) in the standard format (step 114). The facsimile is then added to archive queue 44 (FIGS. 5 and 6) which is a queue holding facsimiles waiting to be archived (step 116). Finally, the facsimile is added to the forwarding queue to complete the store and forward process (step 118).

Figure 11:
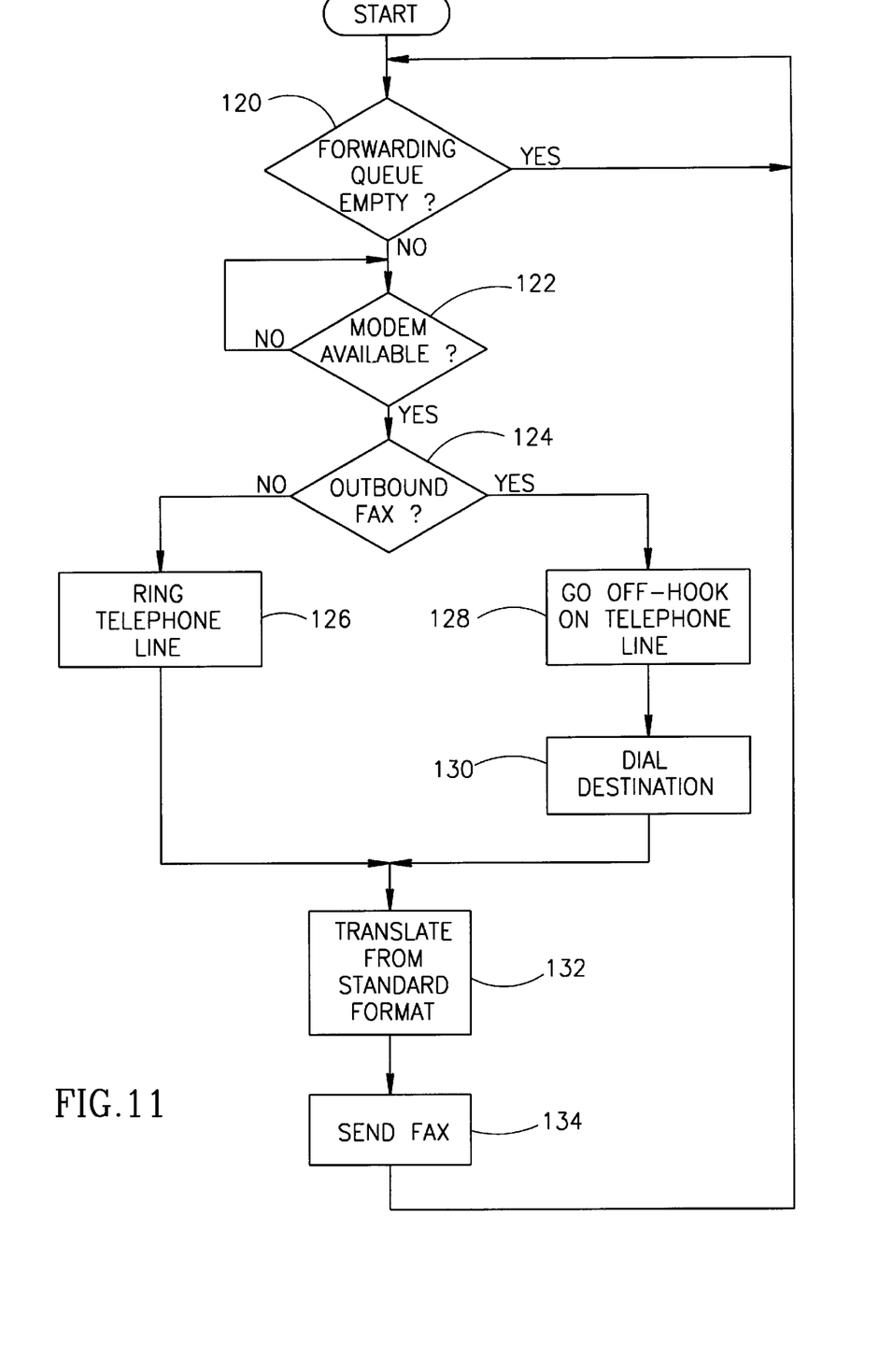
FIG. 11 is a high level flow diagram illustrating the forwarding process of the active facsimile logging system.

The forwarding portion of the store and forward process will now be described in more detail. A high level flow diagram illustrating the forwarding process of the active facsimile logging system is shown in FIG. 11. First, the forwarding queue is continually checked for facsimiles (step 120). Once the queue becomes not empty, it is determined whether there is an available modem (step 122). If there is an available modem, it is then determined whether the facsimile is inbound or outbound (step 124). If it is inbound, the line connecting the particular fax line interface 66 to the destination fax machine 68 (FIGS. 5 and 6) is made to ring (step 126). If it is outbound, the line connecting the particular telephone line interface 62 to the telephone line or PBX extension is made to go off-hook (step 128) and the destination is dialed (step 130) using the digits collected previously (step 106, FIG. 10). Then, the facsimile is translated and decompressed from the standard format, previously stored, into the ITU standard T4 format using the standard facsimile transmission protocol (step 132). After translation, the facsimile is then sent (step 134).

Figure 12:
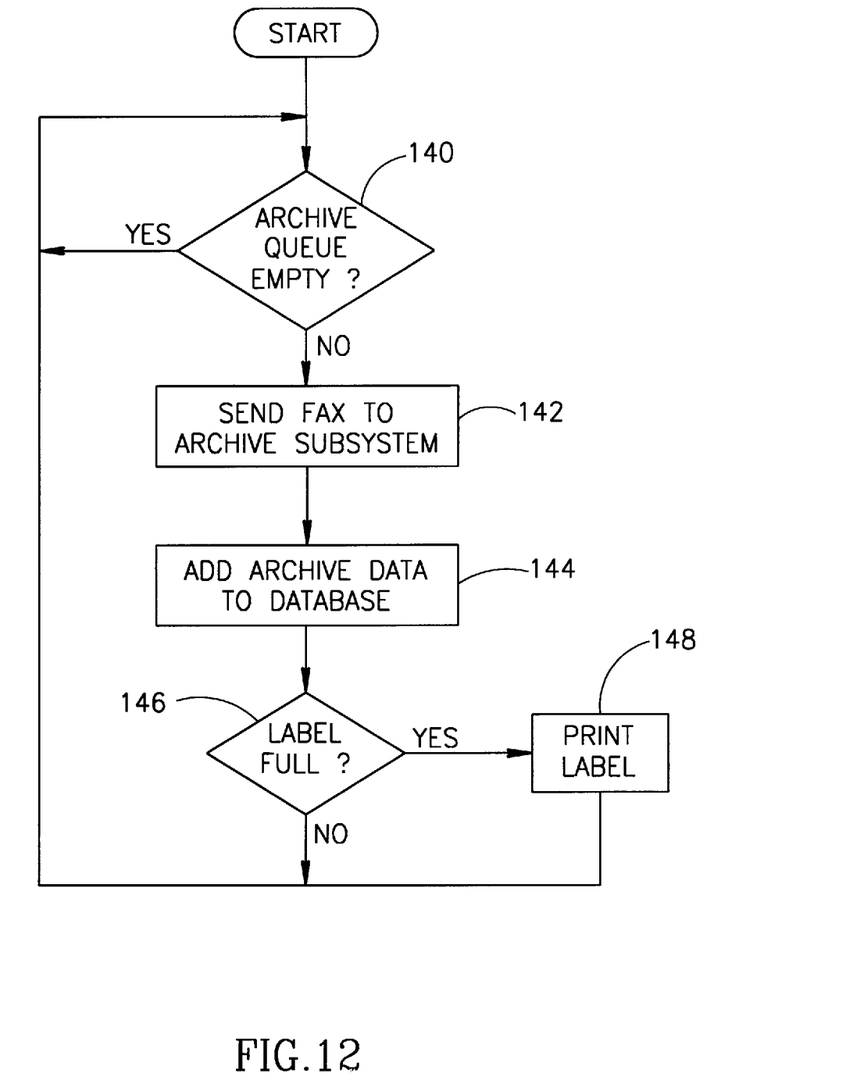
FIG. 12 is a high level flow diagram illustrating the archive process of both the passive and active facsimile logging systems.

The archive process will now be described in more detail. A high level flow diagram illustrating the archive process of both the passive and active facsimile logging systems is shown in FIG. 12. First, it is determined whether the archive queue is empty (step 140). If the queue is not empty, the facsimile is sent to the archive subsystem (FIGS. 3, 4, 5, 6) where it is recorded onto long term storage media such as, magnetic tape, optical disk storage, magneto-optical storage, etc. (step 142). Once the facsimile is recorded onto long term media, the corresponding record in database 40 (FIGS. 3, 4, 5, 6) is updated with the appropriate data (i.e. data pointers) related to the archive (step 144). In addition, to facilitate handling of the various tapes, disks or other media by system operators, labels are generated when the contents of the corresponding media (i.e. tape or disk) become full. Each facsimile recorded is tracked and an entry is added in a label list for that particular tape or disk. Once it is determined that the media is full (step 146), the label is printed (step 148).

Figure 13:
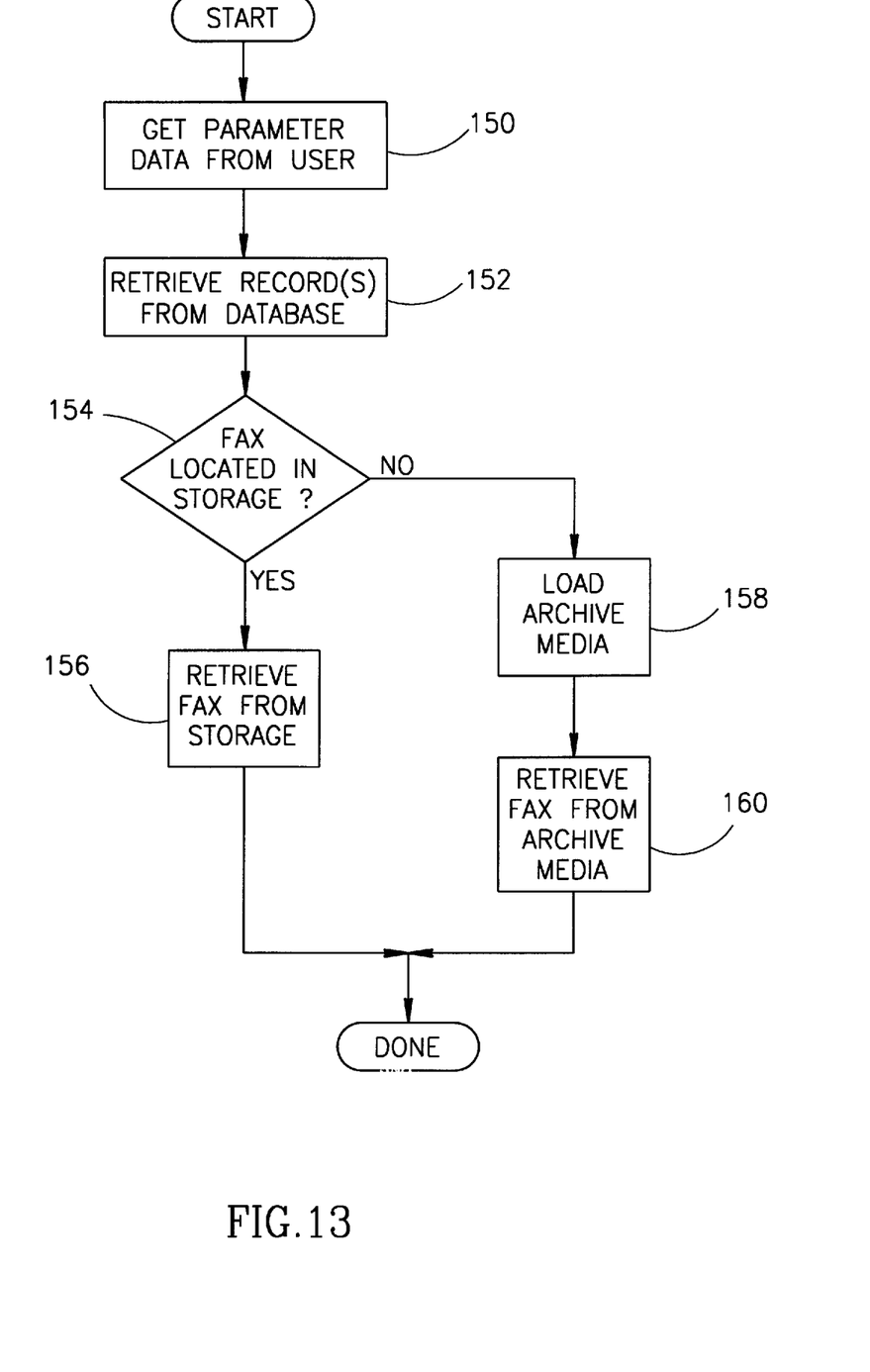
FIG. 13 is a high level flow diagram illustrating the facsimile retrieval process of both the passive and active facsimile logging systems.

The retrieval process of the fax logging system will now be described in more detail. A high level flow diagram illustrating the facsimile retrieval process of both the passive and active facsimile logging systems is shown in FIG. 13. First, the user of the retrieval system enters the parameters comprising the search (step 150). A search engine searches and retrieves the records from the database matching the previously entered search criteria (step 152). If the facsimiles corresponding to the database records found in the search (step 154) are present in storage 46 (FIGS. 3, 4, 5, 6), then they are retrieved from there (step 156). If the they are not located in storage, the appropriate archive media is first loaded onto the system (step 158). For example, if the facsimile exists on a tape located in a tape library, the tape is either manually or automatically retrieved (i.e. through a jukebox). The facsimiles are then retrieved from the long term archive media for viewing and browsing by the user (step 160).

Figure 14:
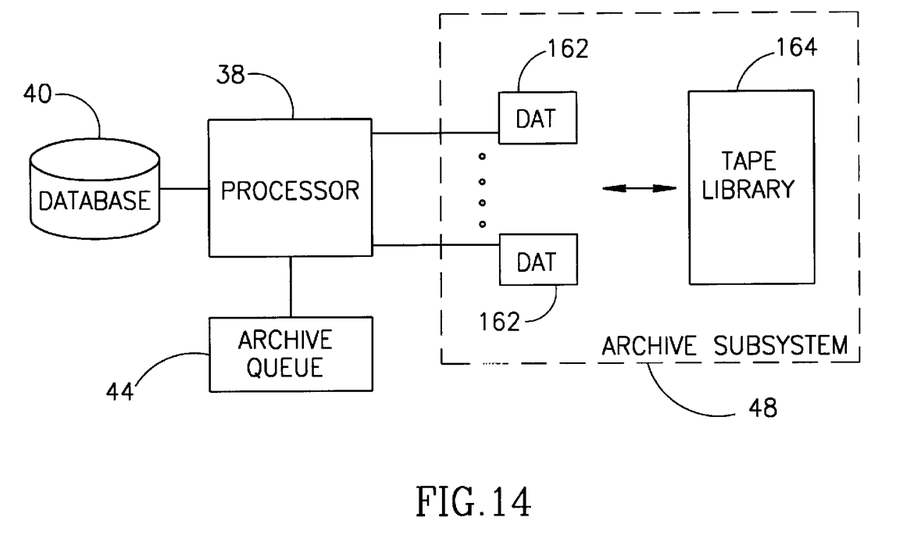
FIG. 14 is a high level block diagram illustrating the archive subsystem of both the passive and active facsimile logging systems.

An example of an archive subsystem 48 used in both the passive and active facsimile logging systems is illustrated in FIG. 14. Processor 38 is coupled to database 40 and archive queue 44. Archive queue 48 comprises one or more archive units, such as DAT drives 162. Alternatively, archive units 162 may be any suitable archive media such as tape, optical, etc. In the case of magnetic tape, a tape library 164 holds tape cassettes full of archived facsimile data. When facsimile search requests are made, the appropriate tape is pulled from tape library 164 and inserted in one of DAT recorders/players 162. In addition, archive units 162 can be arranged in one of several configurations to increase archive reliability and/or performance. Such configurations include mirroring, autoswitching of a unit when its media becomes full, using one archive unit for recording and one for retrieval and using autochangers to automate the retrieval process.

Figure 15:
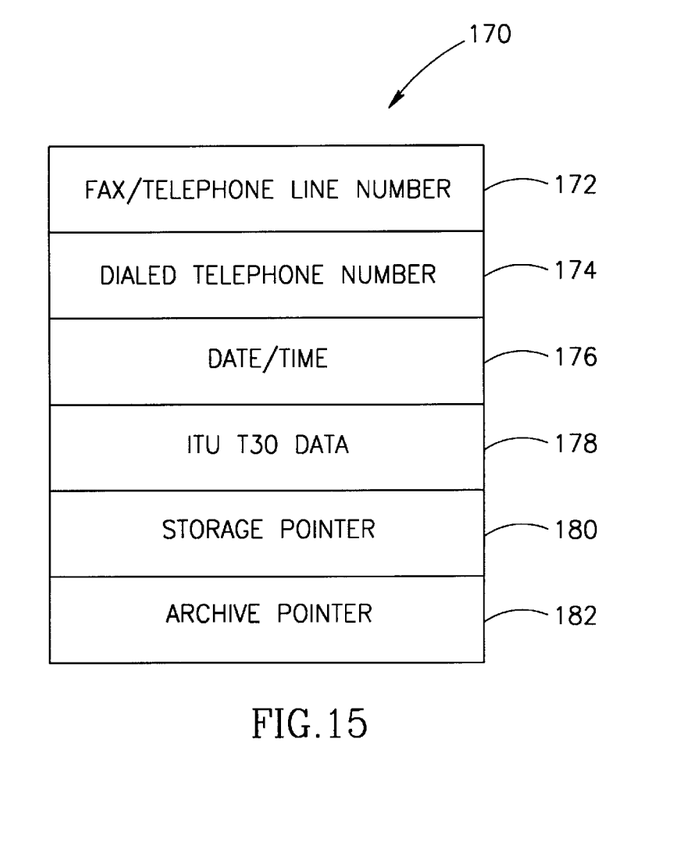
FIG. 15 illustrates the data fields comprising a record of the database used in maintaining information about each facsimile archived in the system.

The data fields comprising a record 170 of the database used in maintaining information about each facsimile archived in the system is illustrated in FIG. 15. The facsimile or telephone line number 172 is stored as a field. The dialed telephone number 174 and the data/time of the received facsimile 176 is recorded. ITU T30 data 178 includes information such as caller ID, receiver ID, facsimile resolution, page size, compression and other facsimile related data. In addition, a pointer to the storage area 180 where the facsimile is stored and a pointer to the location where the facsimile is archived 182 is stored as fields in record 170.

While the invention has been described with respect to a limited number of embodiments, it will be appreciated that many variations, modifications and other applications of the invention may be made.

I claim:

1. A multi-channel passive facsimile logger coupled passively to N telephone lines connected to N facsimile machines, comprising:
    a. N passive telephone line interfaces coupled to said N telephone lines, said N passive telephone line interfaces interfacing said N telephone lines to a switch having N input ports and M output ports, said N passive telephone interfaces operative to not interfere with facsimile transmissions occurring on said N telephone lines;
    b. a facsimile detector coupled to said N passive telephone line interfaces, said facsimile detector detecting the presence of said facsimile transmissions on said N telephone lines;
    c. said switch coupled to said N passive telephone line interfaces through said N input ports, said M output ports coupled to M fax/modems, said switch able to coupled any one passive telephone line interface to any one fax/modem;
    d. said M fax/modems coupled to said M output ports, said M fax/modems for translating said facsimile transmissions from a telephone line facsimile signal format into digital facsimile data;
    e. a processor coupled to said M fax/modems for receiving and processing said digital facsimile data, said processor controlling the operation of said passive facsimile logger, said processor for determining the input to output configuration of said switch;
    f. a database coupled to said processor, said database holding relevant data associated with said facsimile transmissions;
    g. a storage coupled to said processor, said storage providing a temporary memory storage area for said facsimile transmissions as they are received from said telephone line;
    h. an archive subsystem coupled to said processor, said archive subsystem recording said facsimile transmissions on long term archive media, said archive subsystem retrieving said facsimile transmissions, previously archived, upon command from said processor; and i. an archive queue coupled to said processor, said archive queue holding said facsimile transmissions that have been received and are awaiting to be archived.

2. The facsimile logger according to claim 1, wherein N and M are both positive integers.

3. A multi-channel active facsimile logger coupled to N telephone lines and to N facsimile machines, comprising:

a. N telephone line interfaces coupled to said N telephone lines, said N telephone line interfaces interfacing said N telephone lines to an internal data bus;

b. N facsimile line interfaces coupled to said N facsimile machines, said N facsimile line interfaces interfacing said N facsimile machines to said internal data bus;

c. a switch having N input ports and M output ports, said N input ports coupled to said internal data bus, said M output ports coupled to M fax/modems, said switch able to couple any one telephone line interface to any one fax/modem and any one facsimile machine to any one fax/modem;

d. said M fax/modems coupled to said M output ports, said M fax/modems for translating said facsimile transmissions between a telephone line facsimile signal format and digital facsimile data;

e. a processor coupled to said M fax/modems for receiving and processing said digital facsimile data, said processor controlling the operation of said active facsimile logger, said processor for determining the input to output configuration of said switch;

f. a database coupled to said processor, said database holding relevant data associated with said facsimile transmissions;

g. a storage coupled to said processor, said storage providing a temporary memory storage area for said facsimile transmissions as they are received from said telephone line;

h. an archive subsystem coupled to said processor, said archive subsystem recording said facsimile transmissions on long term archive media, said archive subsystem retrieving said facsimile transmissions, previously archived, upon command from said processor; and i. an archive queue coupled to said processor, said archive queue holding said facsimile transmissions that have been received and are awaiting to be archived.

4. The facsimile logger according to claim 3, wherein N and M are both positive integers.

5. A multi-channel facsimile logger, comprising:

a. L passive telephone line interfaces coupled to L telephone lines, said L passive telephone line interfaces interfacing said L telephone lines to an internal data bus, said L passive telephone interfaces operative to not interfere with facsimile transmissions occurring on said L telephone lines;

b. a facsimile detector coupled to said L passive telephone line interfaces, said facsimile detector detecting the presence of said facsimile transmissions on said L telephone lines;

c. N telephone line interfaces coupled to N telephone lines, said N telephone line interfaces interfacing said N telephone lines to an internal data bus;

d. N facsimile line interfaces coupled to N facsimile machines, said N facsimile line interfaces interfacing said N facsimile machines to said internal data bus;

e. a switch having N input ports and M output ports, said N input ports coupled to said internal data bus, said M output ports coupled to M fax/modems, said switch able to couple any one of said N telephone line interfaces to any one of said M fax/modems, any one of said N facsimile machines to any one of said M fax/modems and any one of said L passive telephone line interfaces to any one of said M fax/modems;

f. said M fax/modems coupled to said M output ports, said M fax/modems for translating said facsimile transmissions between a telephone line facsimile signal format and digital facsimile data;

g. a processor coupled to said M fax/modems for receiving and processing said digital facsimile data, said processor controlling the operation of said active facsimile logger, said processor for determining the input to output configuration of said switch;

h. a database coupled to said processor, said database holding relevant data associated with said facsimile transmissions;

i. a storage coupled to said processor, said storage providing a temporary memory storage area for said facsimile transmissions as they are received from said telephone line;

j. an archive subsystem coupled to said processor, said archive subsystem recording said facsimile transmissions on long term archive media, said archive subsystem retrieving said facsimile transmissions, previously archived, upon command from said processor; and k. an archive queue coupled to said processor, said archive queue holding said facsimile transmissions that have been received and are awaiting to be archived.

6. The facsimile logger according to claim 5, wherein L, M and M are all positive integers.

* * * * *